United States Patent [19]

Yagasaki et al.

[11] 4,350,436
[45] Sep. 21, 1982

[54] FEED CONTROL DEVICE

[75] Inventors: Toshiaki Yagasaki, Hino; Shunichi Masuda, Wakabaya; Katsuichi Shimizu, Kunitachi; Hisashi Sakamaki, Yokohama, all of Japan

[73] Assignee: Canon Kabushiki Kaisha, Tokyo, Japan

[21] Appl. No.: 151,673

[22] Filed: May 20, 1980

[30] Foreign Application Priority Data

May 25, 1979 [JP] Japan ................................. 54-64807

[51] Int. Cl.³ ........................................... G03G 15/00
[52] U.S. Cl. ................................ 355/14 SH; 271/265; 271/275; 355/3 SH
[58] Field of Search .............. 355/14 SH, 14 R, 3 SH; 271/275, 265

[56] References Cited

U.S. PATENT DOCUMENTS

| 4,066,225 | 1/1978 | Bradbury | 271/275 X |
| 4,093,372 | 6/1978 | Guenther | 355/3 SH |
| 4,170,414 | 10/1979 | Hubert et al. | 355/14 SH |
| 4,202,621 | 5/1980 | Yoshimura | 355/14 R |
| 4,264,067 | 4/1981 | Adams et al. | 355/3 SH |
| 4,264,187 | 4/1981 | Rhodes | 355/14 SH |
| 4,264,188 | 4/1981 | Tomosada et al. | 355/14 R |

Primary Examiner—Richard L. Moses
Attorney, Agent, or Firm—Fitzpatrick, Cella, Harper & Scinto

[57] ABSTRACT

A feed control device includes a feeder for feeding sheet from copy mediums to a predetermined position, a device for forming an image on or from a copy medium fed by the feeder, and a controller for controlling the driving of the feeder with the copy medium being present at the feeder in order to complete the feed of the copy medium by the inertia force of the feeder.

5 Claims, 9 Drawing Figures

FEED CONTROL DEVICE

BACKGROUND OF THE INVENTION

1. Field of the Invention

This invention relates to a device for feeding originals to an exposure position and discharging the same, for example, in copying apparatus.

2. Description of the Prior Art

Devices are known which feed an original to a platen from a tray containing therein a number of sheet mediums such as originals, discharge the original after exposure, feeds the next original, and repeat a similar operation. In this case, rollers are operated and stopped at a predetermined timing to feed an original. This timing has been executed by detecting the completion of the feed of the original or by a timer set in expectation of the time when the feed will be completed.

In such a method, however, even if the feed OFF control is effected, the next original may sometimes be fed by the inertia of the feed driving system. Also, depending on the configuration of the feed path, originals are liable to jam due to the pressure force of the rollers.

SUMMARY OF THE INVENTION

It is an object of the present invention to eliminate the above-noted disadvantages and to provide a feed control device which ensures that an original will be reliably set for feeding and prevents the feeding of the next original.

It is another object of the present invention to provide a feed control device which enables the feeding of an original to be completed by a smooth feeding force and to reduce troubles such as jamming and the like.

It is still another object of the present invention to provide a feed control device, such as rollers, which effects the feed control by utilizing the inertia force of the feed means, and in which the driving of the feed means is stopped with another original being still present at the feed means.

It is yet still another object of the present invention to provide a feed control device which detects the trailing end of an original before completion of the feed thereof to control the driving of the feed means.

The above and other objects of the present invention will become fully apparent from the following detailed description taken in conjunction with the accompanying drawings.

BRIEF DESCRIPTION OF THE DRAWINGS

FIG. 1-1 is a cross-sectional view of a copying apparatus to which the present invention is applicable.

FIG. 1-2 is a perspective view of the FIG. 1-1 apparatus.

FIGS. 4-1, 4-2, and 4-3 are operation time charts of the FIG. 3 circuit.

DESCRIPTION OF THE PREFERRED EMBODIMENTS

Figure 11:
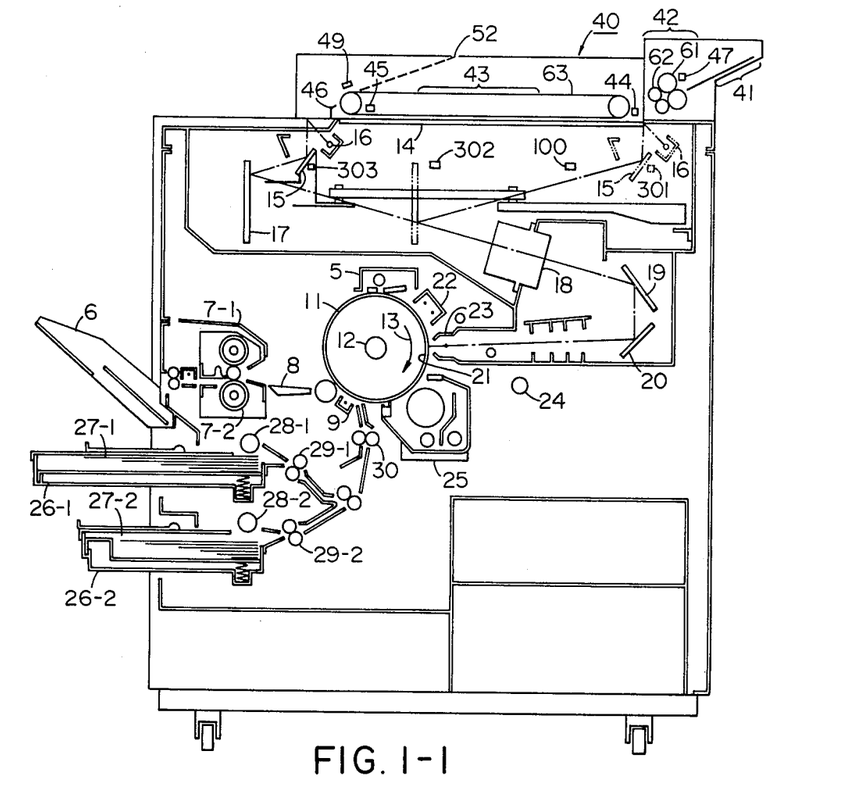
Figure 12:
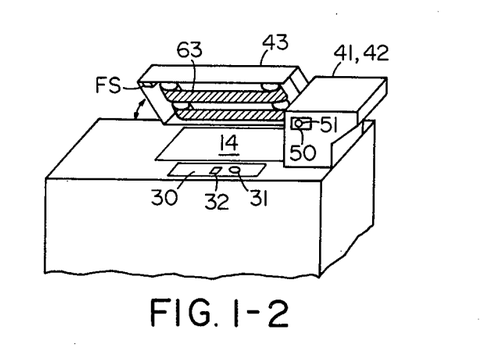

Embodiments of the present invention will hereinafter be described with reference to the drawings. FIG. 1-1 is a cross-sectional view of a variable magnification copying apparatus having an automatic document feeding device (hereinafter referred to as the ADF) to which the present invention is applicable, and FIG. 1-2 is a perspective view of the copying apparatus with the ADF opened.

A drum 11 has, on the surface thereof, a three-layer photosensitive medium using a CdS photoconductive member, and is rotatably supported on a shaft 12 and starts to rotate in the direction of arrow 13 in response to a copy instruction.

When the drum 11 rotates to a predetermined position, an original placed on a platen glass 14 is illuminated by an illuminating lamp 16 formed integrally with a first scanning mirror 15, and the reflected light therefrom is scanned by the first scanning morror 15 and a second scanning mirror 17. The first scanning mirror 15 and the second scanning mirror 17 are moved at a velocity ratio of 1:$\frac{1}{2}$, whereby scanning of the original is effected with the length of the optical path ahead of a lens 18 being maintained constant.

The above-mentioned reflected optical image passes through the lens 18 via a third mirror 19, whereafter it passes via a fourth mirror 20 and is formed on the drum 11 at an exposure station 21.

The drum 11 is charged (for example, to the positive polarity) by a primary charger 22, whereafter at the exposure station 21, it is slit-exposed to the image illuminated by the illuminating lamp 16. Simultaneously therewith, the drum is subjected to AC discharging or discharging of the opposite polarity (for example, the negative polarity) to the primary charge by a discharger 23, whereafter the drum is further subjected to a whole surface exposure by a whole surface exposure lamp 24, whereby an electrostatic latent image of high contrast is formed on the drum 11. The electrostatic latent image on the photosensitive drum 11 is then developed into a visible toner image by a developing device 25.

Transfer paper 27-1 or 27-2 in a cassette 26-1 or 26-2 is fed into the apparatus by a paper feed roller 28-1 or 28-2, and is given rough timing by first register rollers 29-1 or 29-2, and then given precise timing by second register rollers 30 and transported toward the photosensitive drum 11 so that the leading end of the paper is coincident with the leading end of the toner image on the drum.

Subsequently, the toner image on the drum 11 is transferred to the transfer paper 27 as it passes between an image transfer charger 9 and the drum 11.

After the image transfer has been terminated, the transfer paper is guided onto a conveyor belt 8 and directed thereby to a pair of fixing rollers 7-1 and 7-2, by which the transferred image on the transfer paper is pressed and heated for fixation, whereafter the paper is discharged into a tray 6.

After the image transfer, the drum 11 has its surface cleaned by a cleaning device 5 comprising an elastic blade, thus becoming ready for the next cycle.

The copying apparatus shown in FIG. 1-1 is capable of forming, on the drum 11, the information on the original placed on the platen glass 14, on a reduced scale. In order that such reduced-scale information may be formed, the position of the lens 18 is changed in accordance with the reduced magnification and also the velocities of the first scanning mirror 15, the lamp 16 and the second scanning mirror 17 are changed in accordance with the reduced magnification. However, a mechanism is already known and therefore need not be described in detail.

Reference numeral 40 designates an automatic original feeding device, reference numeral 41 denotes a sheet bucket portion containing originals therein, reference numeral 42 designates a feeder portion for separating and feeding the originals, reference numeral 43 denotes a setter portion for setting an original on the exposure surface 14, and reference numeral 52 denotes a tray for receiving the originals after they are used. The ADF 40 is removably mounted with respect to the copier, and the setter portion 43 is openable independently of the portions 41 and 42, as shown in FIG. 1-2.

Operation of the ADF 40 shown in FIGS. 1-1 and 1-2 will be briefly described.

Originals are placed into the bucket portion and the main switches of both of the copying apparatus and the ADF are closed, whereafter the auto button 51 of an ADF operating portion 50 is depressed and the copy button 32 of the copying apparatus operating portion 30 is depressed, whereupon the originals are fed toward separating rollers 61 by the operation of the feeder roller 60 of the ADF, and the lowermost original is separated by separating rollers 61 and passed to register rollers 62. The rollers 62 which are normally stopped are operated for a time required for an original to be fed at a predetermined timing, so that the original is fed under a belt 63 moving around the original plate 14. The original so fed under the belt 63 is transported to a pawl 46 which is lowered in advance at a predetermined timing, and is stopped thereat. The belt 63 is moved around a little further and stopped at a predetermined timing. Until stopped, the belt 63 slides on the original. By this, any oblique position of the original may be corrected. Then, the lamp 16 and mirrors 15, 17 of the copying apparatus start their forward movement to scan the original and a copy is obtained on the transfer paper in the manner described above. When the number of copies set by a dial 31 has been completed, an end signal is supplied to the ADF 40 to raise the pawl 46, and then the belt 63 is again moved around to discharge the original from the platen 14. Simultaneously with this discharging operation, the rollers 61 and 62 are operated to feed the next original toward the belt 63. By this, the copying of the next original can be started early. In the manner described above, the copying is repeated with the originals being successively interchanged.

Reference numerals 44, 45, 47 and 49 in the ADF 40 designate detectors for detecting the presence of originals. The detector 44 is for detecting jamming of an original at the feeder portion of the separating rollers 61 and register rollers 62, the detector 45 is for detecting jamming and erroneous discharge of an original in the setter portion of the belt 63, and the detector 49 is for detecting an original in the discharging portion from the belt 63 to the original discharging tray 52. Each of the detectors 44, 45 and 49 is of the reflection type using a plurality of light-emitting diodes for a light-receiving element. Designated by 47 is a transmission type photodetector for detecting the number of originals remaining in the bucket portion. A reflection type detector 48 is also provided. The belt 63 is grounded to the apparatus body to remove any electrostatic charge developed and accumulated on the belt 63 due to originals being conveyed while being held between the belt and the platen glass.

Also, as shown in FIG. 1-2, the ADF 40 is set so as to be pivotable from one side to the other with respect to the copying apparatus so that the ADF 40 can be spaced apart with respect to the platen 14. The ADF 40 is provided with a switch FS adapted to automatically cut off the power source for controlling the ADF when the ADF 40 is spaced apart from the platen. This prevents the ADF 40 from being operated by closing the ADF main switch SW or depressing the copy button by mistake.

Figure 2:
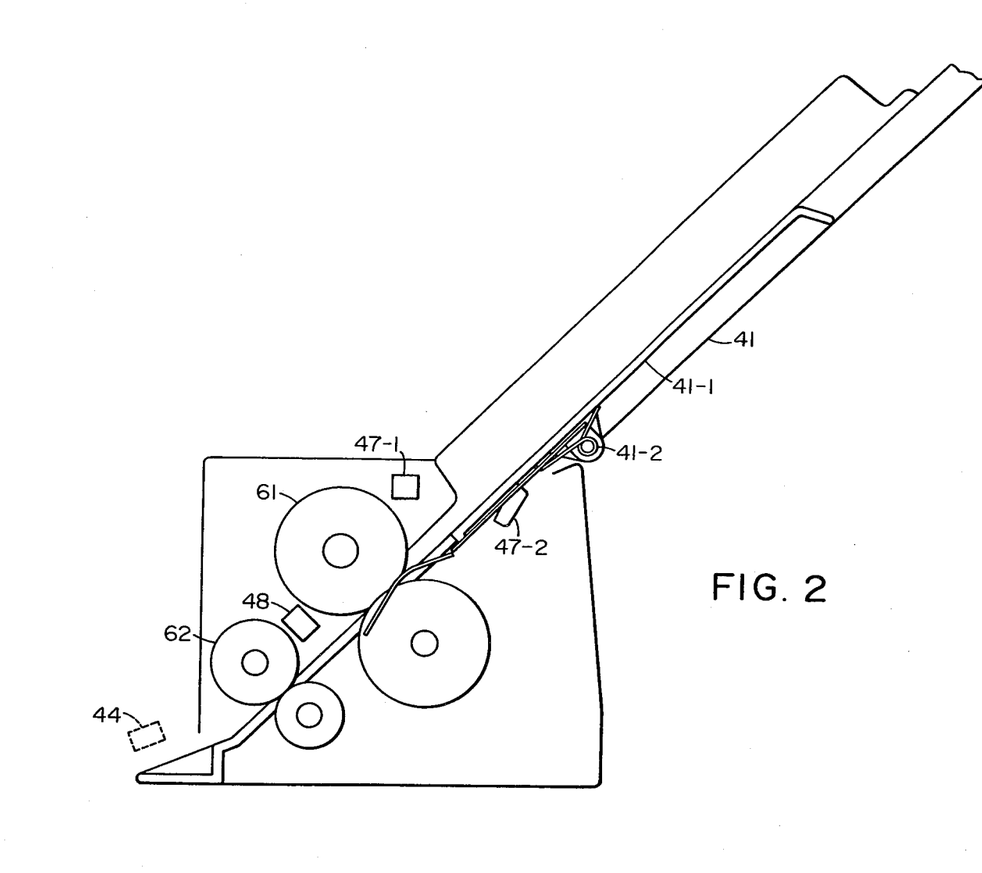
FIG. 2 is a cross-sectional view of the feeding portion of the bucket portion of ADF.

Referring to FIG. 2 which is a cross-sectional view of the bucket portion and feed portion of the ADF 40 in FIGS. 1-1 and 1-2, reference numeral 47-1 designates a lamp for projecting light upon a light-receiving member 47-2, reference numeral 48 denotes a reflection type sensor disposed between the rollers 61 and 62 for detecting an original, reference numeral 41-1 designates a bed for supporting originals thereon, and reference numeral 41-2 denotes a spring for fixing the bed 41-1.

Figure 3:
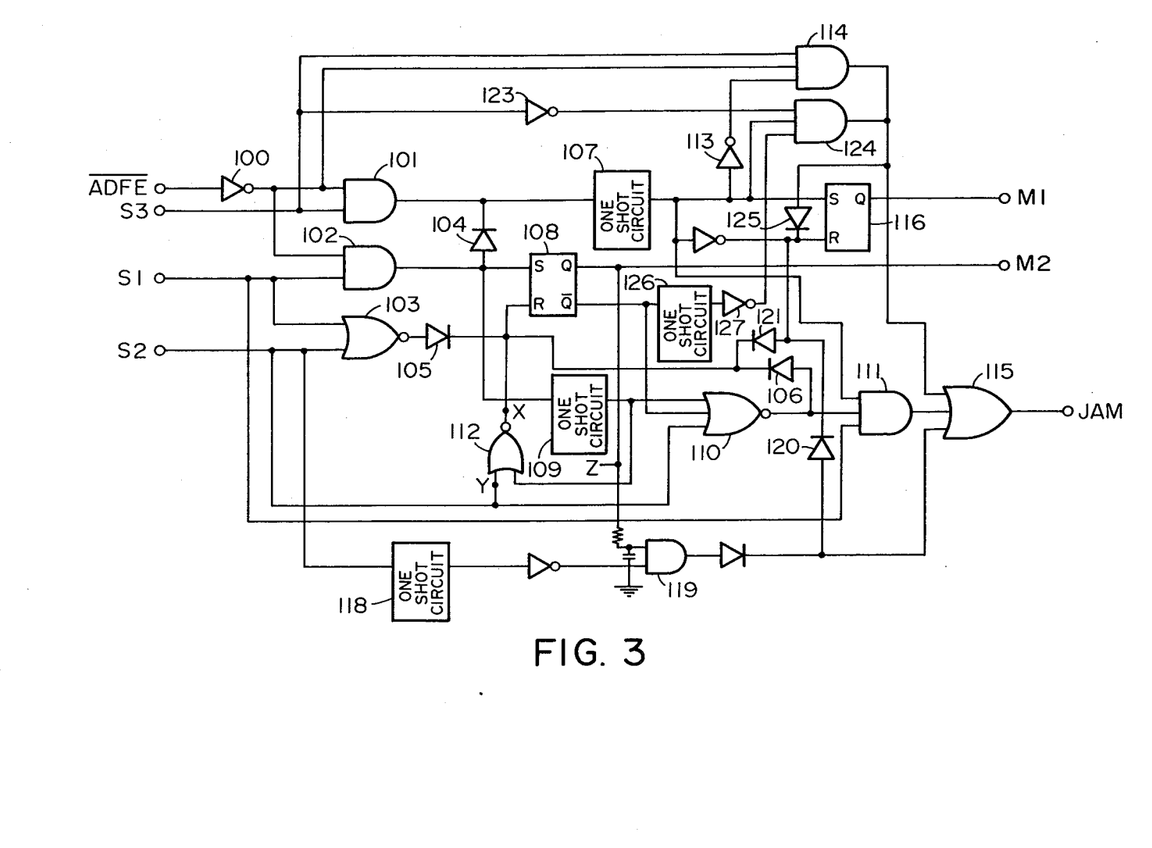
FIGS. 3 and 5 diagrammatically show two examples of the feed control circuit according to the present invention.
Figure 41:
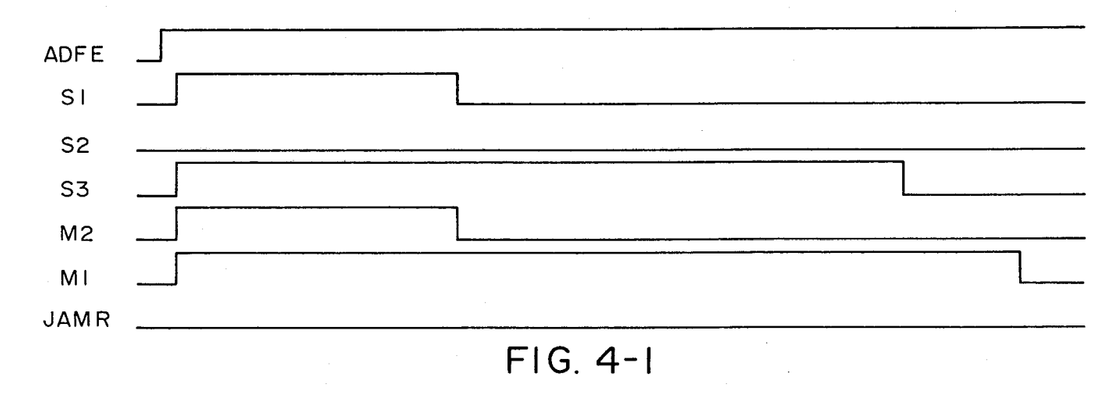
Figure 42:
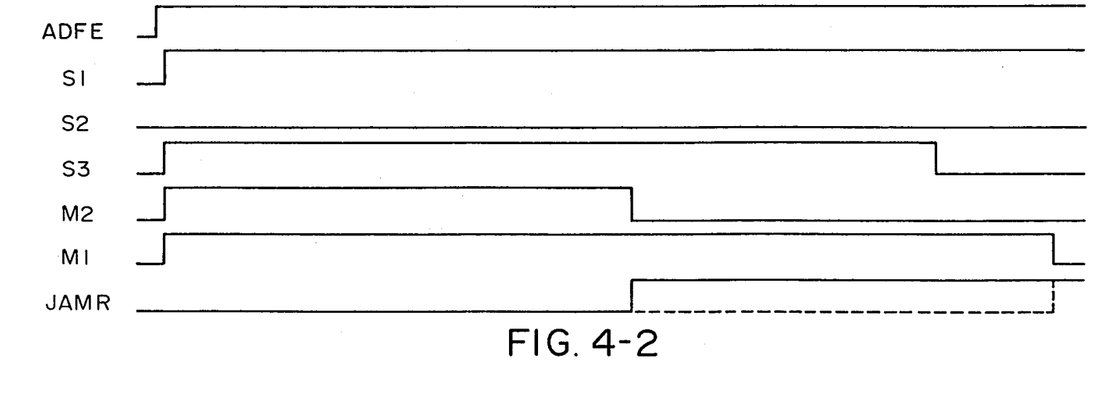

FIG. 3 shows an example of the feed control circuit in the present invention, and FIGS. 4-1 and 4-2 are operation time charts thereof. In FIG. 3, reference numerals 107 and 116 designate a one shot circuit and a flip-flop, respectively, for energizing a first motor M1 for driving the belt 63, reference numeral 108 designates a flip-flop for energizing a second motor M2 for driving the feed rollers 61 and 62, and reference numeral 109 denotes a one shot circuit for detecting jamming of an original. The one shot circuits 107 and 109 are one shot multivibrators which provide timers, wherein the circuit 107 turns OFF after a time required for an original to be set on the setter portion, and the circuit 109 turns OFF after a time required for an original to arrive at the feed sensor. The flip-flop 108 is such that the Q and $\overline{Q}$ terminals thereof become 1 and 0, respectively, for the pulse to the terminal S thereof and that the $\overline{Q}$ and Q terminals thereof become 1 and 0, respectively, for the pulse to the R terminal thereof. Designated by 111, 114 and 115 are AND gates and an OR gate for energizing a jamming displayer. Denoted by 101 and 102 are AND gates for controlling the motors M1 and M2. Reference numeral 103 designates a NOR gate for controlling the motor M2, reference numeral 110 denotes a NOR gate for controlling the displayer and motor M2, reference numeral 112 designates a NOR gate for de-energizing the motor M2, reference numerals 100 and 113 denote inverters, reference numerals 104 and 105 designate one-direction diodes, and ADFE is an ADF start signal, generated when the set number of copies have been completed or when the last scan has been terminated and the scanning means is reversed in movement. The signal ADFE is also put out by a key instructing the possibility of operation. Also, where the stop key, cut-in key etc. have been depressed on the apparatus body side, the signal ADFE is put out when the scan, at that point, has been terminated and the scanning means is reversed in movement. S3 is a signal which becomes 1 during the time that the discharge check sensor 45 is detecting an original, S1 is a signal which becomes 1 during the time that the bucket sensor 47 is detecting an original, S2 is a signal which becomes 1 during the time that the post sensor 44 is detecting an original, and JAM is a signal for setting an unshown circuit for turning on and off a jam lamp. The bar signal of the ADF means reversal of the level of the signal ADFE.

If the ADF key is depressed when originals are contained in the bucket portion, the flip-flop 108 is set by the signals ADFE and S1 through the gate 102 to operate the feed rollers 61 and 62, which thus separate and start to feed the lowermost original from the bucket.

Simultaneously therewith, the one shot circuit 107 is energized through a diode 104 to operate the motor M1, which thus starts to drive the belt. Also, as regards the original already set on the setter portion, when the preset number of copies have been completed, the belt and feed rolles are driven by the signal ADFE and the discharge sensor signal S3 (which means the presence of an original in the setter portion) through the gates 101 and 102, thereby interchanging the original. The output $\theta$, put out when the flip-flop 108 is set at the time of start, is delayed by an RC circuit and applied to the AND gate 119. The delay time determined by this RC is at least equal to the time during which an original is fed to actuate the sensor 44 and accordingly, at this point of time, the one shot circuit 118 is energized, wherefore, the output of the AND gate becomes 0 with the result that a jam signal is not put out.

The one shot circuit 109 as the jam timer is set through the gate 102 and starts the jam check operation by the post sensor 44. When the fed original arrives at the sensor 44 within the timer period of this one shot circuit 109, the output of the gate 110 is 0 due to the signal S2 being 1 even if the time of the one shot circuit 109 is completed, and the output of the jam outputting gate 111 does not become 1. Accordingly, the jam display signal JAM is not set.

However, where the signal S2 does not become 1 before the timer of the one shot circuit 109 is completed, the gate 110 puts out 1 because it receives as inputs the signal 0 from the flip-flop 108, the signal 0 of the one shot circuit 109 and 0 of the signal S2, and the gate 111 to which the belt signal M1 is applied becomes 1, thus producing a JAM output. At the same time, the flip-flop 108 is reset through the diode 106 to stop the motor M2 of the feed rollers.

The belt is not stopped unless the flip-flop 116 is reset after the lapse of the timer period of the one shot circuit 107 or with the setter jam, and therefore, the original being discharged can be discharged completely out of the machine.

In cases other than jamming, when an original passes the feed sensor 44 and its trailing end comes to that sensor, the signal S2 changes from 1 to 0. Upon this change, 0 is applied to both inputs of the gate 112, which thus puts out 1 to reset the flip-flop 108 and, accordingly, de-energizes the feed roller motor M2. The gate 110 receives 1 from the flip-flop 108 and thus, it does not produce a jamming output. Thereafter, the original is conveyed on the platen by the belt 63 and set thereon and strikes against a stop 46. For a short time, the belt is moved, and is stopped after the predetermined time set by the one shot circuit 107. Then, a copy start signal is put out to the copier side to start the exposure scanning.

When oblique movement of an original is found during its feed in the feed portion and such original has been removed with the originals in the bucket portion to prevent further oblique movement of the original, the signals S1 and S2 become 0. Accordingly, the output of the gate 103 becomes 1 to reset the flip-flop 108 and de-energize the motor M2, thus stopping the feed rollers from rotating. However, the flip-flop 116 for the belt motor M1 is not reset and so, the belt continues to move causing the original copies on the platen to be completely discharged. When the originals are again set in the bucket portion, the feeding flip-flop is set through the gate 102 because the signal ADFE has already been latched, and thus the feeding operation is effected.

Description will now be made of jamming occurring when an original has arrived at the post sensor 44 but could not pass such sensor. When the leading end of the original is detected by the post sensor 44, the one shot circuit 118, which registers 0 after at least the time required for the original to pass the sensor, 44 is energized. If the trailing end of the original is detected during that time, the gate 119 puts out 0, but, if not, the gate 119 puts out 1 to effect display through the gate 115. At the same time, the flip-flop 116 is reset through the diode 120 to de-energize the motor M1 and stop the belt motor, and the flip-flop 108 is reset through the diode 121 to de-energize the motor M2 and stop the feed roller motor. Thus, the feeding is immediately stopped to prevent the original from being destroyed.

When a jam has occurred on the platen leading to the discharge sensor 45 and the arrival of an original has been delayed, the gate 124 acts to effect a jam display. That is, the one shot circuit 126 is set by the OFF timing of the motor M2, and an original is properly moved after the trailing end thereof has passed the sensor 44, and the timer operation for rendering the signal from 1 to 0 takes place after the time required for the original to actuate the sensor 45. When the diode 121 has become 0, the gate 124 applies 1 by the inverter 127. If the signal S3 is then 1 by the discharge sensor, the gate 124 registers 0 by the inverter 123 and does not affect the jam display; but when the signal S3 is 0, the output of the gate 124 becomes 1 and this gate registers the signal JAM through the gate 115. At the same time, the flip-flop 116 is reset through the diode 125 to de-energize the belt motor.

Also, to detect jamming during discharge of an original, the signal of the sensor 45 is checked at a timing for de-energizing the belt motor M1. That is, when the output of the one shot circuit 107 is 1 by the diode 112 and when the signal S3 is 0, the apparatus is regarded as normal, but when the signal S3 is 1, and the original has not yet been discharged then the apparatus is regarded as abnormal and a jam display is effected. At this time, the motors M1 and M2 have already been stopped, therefore the process involved is to prevent the start of the copying on the copier side.

In this manner, the various sensors on the platen monitor the conveyance of originals and this leads to minimized destruction of the originals, and moreover, jam detection is distinctively effected to provide smooth re-start of the ADF.

Figure 43:
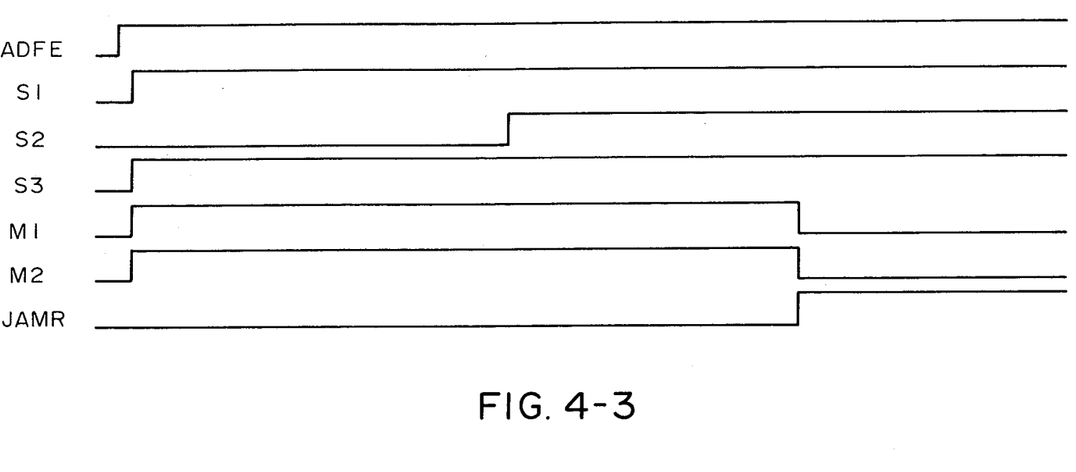

By making the discharge timing check of the discharge sensor 45 corresponds to the time when the stop 46 is lowered, it is also possible to effect the jam check by use of the lowering signal of such stop. At the same time, it is also possible to compare this signal with the signal S2 of the post sensor 44, and thereby detect any erroneous feed. It is also possible to effect the triggering of the delay checking one shot circuit 121 by the change from 1 to 0 of the feed stagnancy checking one shot circuit 118. FIG. 4-1 is a time chart referring to a case where an original has been removed from the feed rollers. FIG. 4-2 is a time chart referring to the case of feed jamming, and FIG. 4-3, is a time chart referring to the case of feed stagnancy jam. In any of these charts, the ADF is started when originals have been set in the bucket, but the ADF may also be started by the ADF key on the ADF side or the copy button on the copier side.

Figure 5:
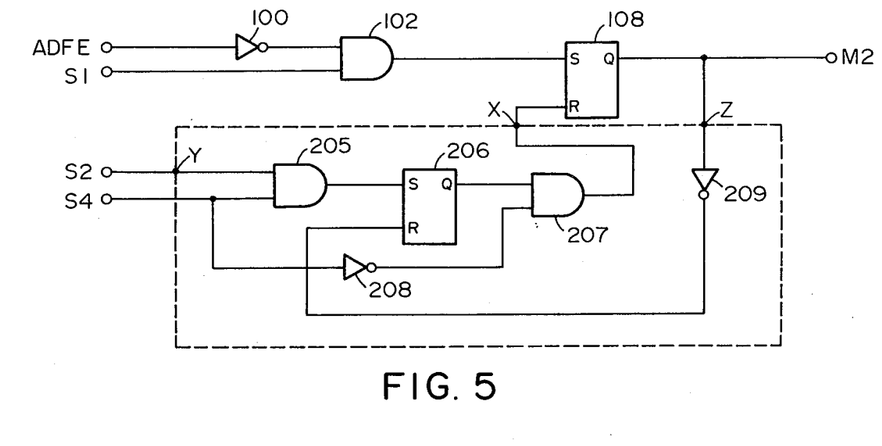
Figure 6:
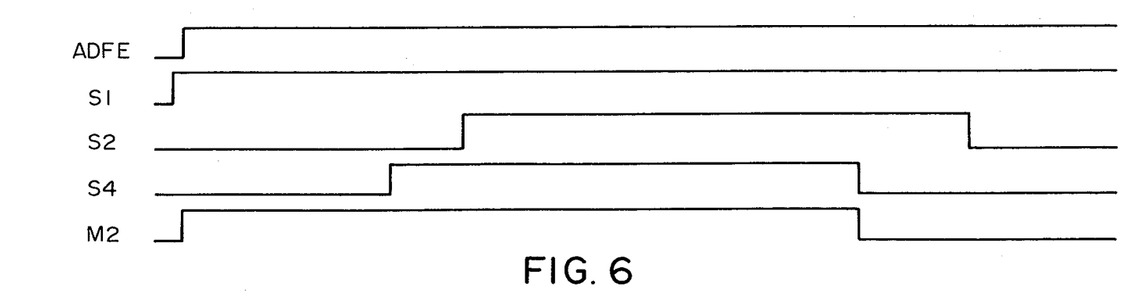
FIG. 6 is an operation time chart of the FIG. 5 circuit.

FIG. 5 shows another example of the feed control circuit in the present invention, and FIG. 6 is an operation time chart of the FIG. 5 circuit. In FIG. 5, reference numeral 206 designates a flip-flop for controlling the feed roller controlling flip-flop; reference numeral 205 denotes an AND gate for controlling the flip-flop 206; reference numeral 207 designates an AND gate for resetting a flip-flop 204; X, Y and Z are ports connecting to X, Y and Z of FIG. 3 thereby providing the function of FIG. 5 in FIG. 3; S4 is the signal which becomes 1 when a reflection type sensor 48 (hereinafter referred to as the presensor) has detected an original. The other elements are similar to those in FIG. 3.

The operation of the mechanism will now be described. The flip-flop 108 is set by the ADF signal and the original signal S1 of the bucket portion to operate the feed roller and the start of feeding of an original. The fed original is detected by the presensor 48, and 1 of S4 is applied to the gate 205. The feeding is continued and the original is detected by the post sensor 44, and 1 of S2 is put out, whereupon the flip-flop 206 is set by the output of the gate 205 and 1 is put out from Q. However, 0 is being applied to the other input of the gate 207 through the inverter 208. Thus, the gate 207 does not register its output and, thus, does not reset the flip-flop for the feed motor. When the original has passed the presensor 48 and the signal S4 changes from 1 to 0, both inputs of the gate 207 become 1 and the gate 207 registers 1. Accordingly, the flip-flop 108 is reset to de-energize the feed motor M2. At this time, the original is still present on the feed rollers 62, but even if the driving of the feed rollers 62 is stopped, the rollers 62 try to continue rotating due to their inertia and, thus, the remainder of the originals can be discharged from the rollers 62 by the remaining rotational force of the rollers 62 and fed into the setter portion. Also, since the feeding force of the rollers 62 is weakened, the original can be smoothly fed along the curved path from the feeder portion to the setter portion. Since the driving of the rollers 62 has been stopped, a next original in the bucket portion is only separated by the rollers 61 and is prevented from being fed through the rollers 62. This roller OFF timing is made to correspond to the time when the second half or trailing end portion of the original passes the rollers 62, as is shown in FIG. 6.

When it is necessary to delay the OFF timing of the separating rollers 61 and feed rollers 62 depending on the length of the feeder portion, the length of the original, the position of the rollers, etc., it can also be controlled by a timer or the like.

The flip-flop 108 is again set by the next ADF signal and the next original is fed by the feed rollers 61 and 62 and, in the manner previously described, the roller motor is de-energized at the time when the feed has not yet been completed. Wherein the original, which is no longer driven by the rollers is held between the belt 63 and the platen 14, and a feeding force is transmitted to that original by the belt which discharges the preceding original. Accordingly, the original is set on the platen by the belt.

Although the trailing end of the original is detected by the presensor to stop the rollers, it is also possible to measure a predetermined time from the ADFE signal and stop the driving of the rollers 62 at the time when the second half of the original comes to the rollers. It is also possible to stop the driving of the rollers 62 by detecting the leading end of the original by the sensor 44 provided rearwardly of the rollers 62.

Also, the timing at which the driving of the rollers 62 is stopped may correspond with the angle at which the original is discharged, and the weight of the rollers 62 may be controlled by a timer or the like after the original has been detected by the sensor.

The present invention is not restricted to the feeding of originals but is also applicable to the feeding of sheets contained in the cassette 26-1 or 26-2.

What we claim is:

1. A feed control device comprising:
means for feeding sheet mediums to a predetermined position;
control means for de-energizing the driving force to said feed means, while a sheet medium is engaged therein, wherein inertia forces of the feed means complete the feed of said sheet medium.

2. A feed control device according to claim 1, wherein said control means detects the trailing end of the medium by detector means provided upstream of said feed means to thereby stop the driving of said feed means.

3. A feed control device according to claim 1, wherein said control means stops the driving of said feed means a predetermined time after it is started.

4. A feed control device according to claim 1, wherein said feed means comprises a roller and the feed is completed by the inertia force thereof.

5. A feed control device according to claim 2, wherein said detector means is a reflection type sensor.

* * * * *